United States Patent
Stumer et al.

(10) Patent No.: US 7,103,153 B2
(45) Date of Patent: *Sep. 5, 2006

(54) METHODS AND APPARATUS FOR TRANSMITTING ACCURATE EMERGENCY LOCATION IDENTIFICATION NUMBERS (ELINS) AFTER AN EMERGENCY CALLER DISCONNECTS

(75) Inventors: Peggy M. Stumer, Boca Raton, FL (US); Nissim Ozery, Parkland, FL (US); Jorge Waimin Siu, Miami, FL (US); Heinz Schmitt, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 274 days.

This patent is subject to a terminal disclaimer.

(21) Appl. No.: 09/816,838

(22) Filed: Mar. 23, 2001

(65) Prior Publication Data
US 2002/0136363 A1 Sep. 26, 2002

(51) Int. Cl.
H04M 11/04 (2006.01)

(52) U.S. Cl. .............................. 379/45; 379/37; 379/49
(58) Field of Classification Search ................. 379/45, 379/39, 37, 38, 49, 142.01, 201.01, 215.01, 379/198
See application file for complete search history.

(56) References Cited

U.S. PATENT DOCUMENTS

| | | | | |
|---|---|---|---|---|
| 4,924,491 A | * | 5/1990 | Compton et al. | 379/37 |
| 5,161,180 A | | 11/1992 | Chavous | 379/45 |
| 5,339,351 A | * | 8/1994 | Hoskinson et al. | 379/45 |
| 5,347,567 A | | 9/1994 | Moody et al. | 379/45 |
| 5,347,568 A | | 9/1994 | Moody et al. | 379/45 |
| 5,771,283 A | | 6/1998 | Chang et al. | 379/142 |
| 5,864,755 A | | 1/1999 | King et al. | 455/404 |
| 6,028,915 A | | 2/2000 | McNevin | 379/49 |
| 6,243,442 B1 | * | 6/2001 | Tanaka et al. | 379/45 |
| 6,266,397 B1 | | 7/2001 | Stoner | 379/45 |
| 6,289,083 B1 | | 9/2001 | Ray | 379/49 |
| 6,301,483 B1 | * | 10/2001 | Israelsson | 455/462 |
| 6,370,232 B1 | | 4/2002 | Yrjana | 379/37 |
| 2002/0101961 A1 | | 8/2002 | Karnik et al. | 379/45 |

FOREIGN PATENT DOCUMENTS

| | | | |
|---|---|---|---|
| EP | 0 700 222 A2 | 3/1996 | |
| EP | 1 009 177 A2 | 6/2000 | |

(Continued)

OTHER PUBLICATIONS

"NENA Technical Information Document on Model Legislation Enhanced 9–1–1 for Multi–Line Telephone System", Nov. 2000, pp. 1–15.
Cisco Systems Contribution to Assist TR–41 Standards Committee entitled "Enterprise Network–Based Solution For Locating 911 Caller Using an IP Phone"; dated Feb. 2001, pp. 1–4; Document No. TR–41.4/01–02–069.

*Primary Examiner*—Melur Ramakrishnaiah

(57) ABSTRACT

The invention is directed to methods (and corresponding apparatus) for accurate transmission of an ELIN/callback number from an emergency caller after the emergency call goes on-hook. The methods include (upon initiation of an emergency call) the steps of storing an emergency location identification number and/or callback number in a buffer; and, upon detecting an on-hook event, transmitting the ELIN and/or callback number from the buffer. According to a preferred embodiment of the invention, the emergency call is disconnected after said step of transmitting; and prior to said step of transmitting, optionally first over private network and to the public network PSAP, a timer is initiated. The step of disconnecting is performed after the timer expires.

18 Claims, 6 Drawing Sheets

FOREIGN PATENT DOCUMENTS

| | | |
|---|---|---|
| GB | 2 320 849 A | 7/1998 |
| GB | 2 349 774 A | 11/2000 |
| JP | 402216992 A | 8/1990 |
| JP | 407336433 A * | 12/1995 |
| JP | 408307438 A | 11/1996 |
| JP | 410051553 A * | 2/1998 |
| JP | 410210171 A * | 8/1998 |
| JP | 411275263 A | 10/1999 |
| WO | WO 00/07393 | 2/2000 |

* cited by examiner

METHODS AND APPARATUS FOR TRANSMITTING ACCURATE EMERGENCY LOCATION IDENTIFICATION NUMBERS (ELINS) AFTER AN EMERGENCY CALLER DISCONNECTS

This application is related to co-owned co-pending application Ser. No. 09/816,843 entitled "Methods and Apparatus For Transmitting Accurate Emergency Location Identification Numbers (ELINs) From Behind A Multiline Telephone System (MLTS) Utilizing Port Equipment Numbers"; co-owned co-pending application Ser. No. 09/816,627 entitled "Priority Based Methods And Apparatus For Transmitting Accurate Emergency Location Identification Numbers (ELINs) From Behind A Multiline Telephone System (MLTS)"; co-owned co-pending application Ser. No. 09/816,830 entitled "Methods and Apparatus For Transmitting Over A Private Network Accurate Emergency Location Identification Numbers (ELINs) From Behind A Multiline Telephone System (MLTS) Utilizing Port Equipment Numbers"; co-owned co-pending application Ser. No. 09/816,823 entitled "Methods And Apparatus For Transmitting Accurate Emergency Location Identification Number (ELINs) From Behind A Multi-Line Telephone System (MLTS) After An Emergency Caller Disconnects"; co-owned co-pending application Ser. No. 09/815,685 entitled "Methods and Apparatus For Dialing An Emergency Telephone Number From A Teleworking Client Remotely Coupled To A PBX"; and co-owned co-pending application Ser. No. 09/815,468 entitled "System For Dialing An Emergency Telephone Number From A Teleworking Client Remotely Coupled To A PBX", the complete disclosures of which are hereby incorporated by reference.

BACKGROUND OF THE INVENTION

1. Field of the Invention

This invention relates to telecommunications systems, especially PBX/Server systems, also referred to as Multi-Line Telephone Systems (MLTS). Specifically, the invention relates to completing an emergency, e.g. 911, call from a station/device and delivering precise location information of the caller when the emergency caller disconnects immediately.

2. Brief Description of the Prior Art

When a caller calls an emergency number, e.g. 911, the call is routed to a Public Safety Answering Point (PSAP). In some jurisdictions, regulatory agencies require that the caller's telephone number/callback number and/or precise physical location referred to as an Emergency Location Identification Number (ELIN), be automatically provided to the PSAP. This information is used to locate the caller and to call back to the caller should there be a disconnect.

A caller identification (i.e., telephone number and ELIN) may be delivered to the PSAP either in-band (e.g., using DTMF signaling) or out-of-band (e.g., using ISDN signaling) depending on the type of trunk circuit employed. For residential callers Caller ID number is sufficient for the PSAP. For PBX/server service many users, e.g., commercial callers, hotel guests; an ELIN is required for this complex environment, for example, street address, floor number, room number, desk number. In some cases, the ELIN is geodetic, i.e. includes earth coordinates or GPS data.

Modern PBX/MLTS systems provide many new features to accommodate the way modern businesses operate. For example, employees may be assigned personal identification numbers (PINs) that are used by the PBX/MLTS to identify the employee and assign a telephone number to him/her. Further, for example, if an employee is assigned to a different location in the building, an automatic relocation feature can be activated using the PIN to reassign the employee's telephone number to the new location.

Another feature of PBX/MLTS systems is that some telephones connected to the PBX/MLTS system may not be provided with the ability to receive direct (inward) dialed calls. For example, in a hotel, telephones in rooms are typically not capable of receiving a direct inward call from outside the hotel, therefore they have no known Caller ID to identify them to the PSAP.

Still another feature of modern PBX/MLTS systems is that it is possible to make many or even all telephone lines available for use by multiline devices connected to the system. Thus, a caller from behind the PBX/MLTS system may be identified by many different telephone numbers.

All of these features of modern PBX/MLTS systems present problems for transmitting call back number and ELIN to a PSAP in an emergency call. In many situations, the only callback number provided from the PBX/MLTS system is the main directory billing number. In situations where the caller has utilized the automatic relocation feature of the PBX/MLTS system, the caller will be identified by employee PIN but not by a specific location. In situations where the caller has no direct inward call receive capability, the PSAP cannot call back the caller in the event of a disconnect. In the situation of a call from a multiline device, the telephone number from which the emergency call is made may not be the primary number for the caller and a return call to that number may cause a different device to ring rather than the caller's device. Moreover, the number used by the emergency caller may be associated with a ELIN which is not the caller's ELIN.

Co-owned co-pending application Ser. No. 09/816,830 and co-owned co-pending application Ser. No. 09/816,843 discloses method and apparatus for accurately reporting the ELIN of an emergency caller behind a PBX/MLTS system to a PSAP.

The methods include assigning a port equipment number (PEN) to each device/trunk associated with the PBX/MLTS system, maintaining a database of ELIN and callback numbers associated with PENS, identifying an emergency number when it is dialed, invoking an emergency service routing upon detection of a dialed emergency number, associating the PEN with the dialer of the emergency number, retrieving the ELIN and callback number from the database, and transmitting the ELIN and callback number to the PSAP. The apparatus includes database management means, emergency number detection means, call routing means, ISDN and non-ISDN signaling means. The apparatus may be configured so that either the callback number, the ELIN, or both are transmitted to the PSAP. Further, the apparatus may be configured to recognize multiple emergency numbers and to give emergency calls priority over non-emergency calls.

The specificity of the ELIN can be determined by the system administrator and additional text information may be associated with the ELIN. The call routing and signaling means are capable of routing the emergency call through multiple PBX/MLTS systems before reaching the public network.

One problem that is not solved by the co-owned co-pending applications is the problem of a caller immediately disconnecting an emergency call before the ELIN/callback number can be transmitted to the PSAP. Such a situation might occur in different ways, e.g. criminal activity forcing unintentional hang-up, accidental dialing followed by intentional hang-up, an emergency requiring immediate flight, etc. The PSAP may receive the primary billing number but not the accurate ELIN/callback number. This results in ambiguity for the PSAP. It may be impossible to determine whether the call was a mistake or whether and where the emergency is.

SUMMARY OF THE INVENTION

It is therefore an object of the invention to provide methods and apparatus for accurately reporting the ELIN and/or callback number of an emergency caller behind a PBX/MLTS system to a PSAP.

It is also an object of the invention to provide methods and apparatus for accurately reporting the ELIN and/or callback number of an emergency caller behind a PBX/MLTS system to a PSAP when the caller immediately disconnects.

In accord with these objects which will be discussed in detail below, ELIN/callback number information is buffered immediately upon the detection of an emergency call, upon the detection of an on-hook event prior to transmitting the ELIN/callback number information, a timer is activated and ELIN/callback number information is transmitted from the buffer before the timer expires. When the timer expires, the call is disconnected. Additional benefits and features of the invention will be apparent from the following detailed description taken together with the attached drawings.

DETAILED DESCRIPTION

Figure 1:
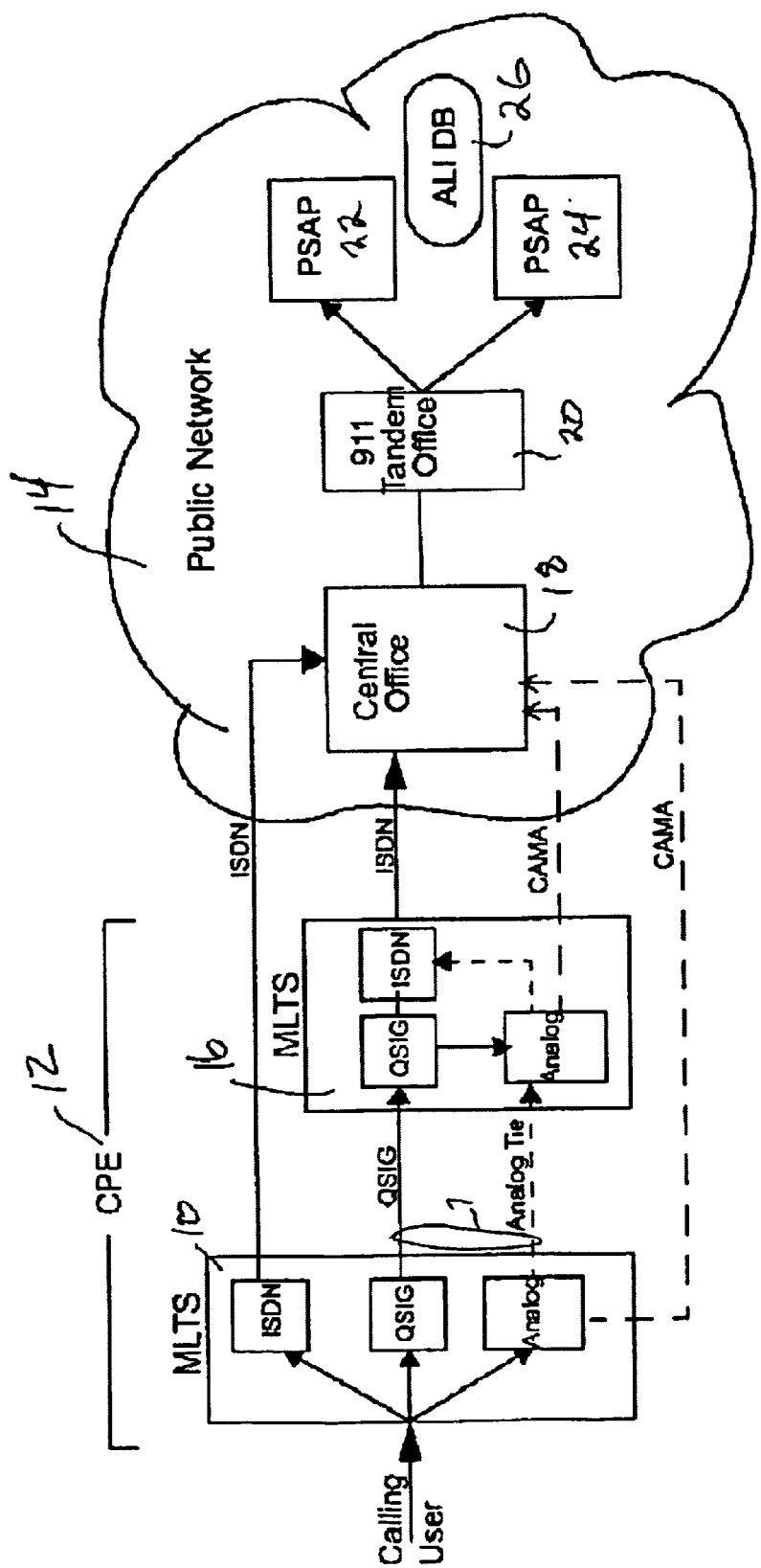
FIG. 1 is a high level illustration of a PBX/MLTS system according to the invention in the process of making an emergency call.

FIG. 1 provides an overview of an emergency call as originated in a private network (via MLTS 10) on Customer Premise Equipment (CPE) 12.

According to the invention, the call may be routed directly to the public network 14 or first transit over the private network (via one or more other MLTS 16) to a far end "hop off" to the public network 14. The private network route may include ISDN (e.g., QSIG/PSS1) or analog tie trunks.

Furthermore, according to the invention, the ELIN/callback number shall be sent with the emergency call over the private network 12 then to the public gateway MLTS 16. The MLTS 10 or 16 may send the emergency call and ELIN/callback number via an ISDN PRI or analog CAMA (centralized automatic message accounting) trunk to the public network 14. In either case, the Central Office 18 receives the information and routes the call to the proper 911 Tandem Office 20 which routes the call to the appropriate PSAP 22, 24.

A special Automatic Location Identification database (ALI DB) 26 is maintained to match the received ELIN and/or Callback number and display associated information at the PSAP. It is the MLTS administrator's responsibility that the caller information be correctly listed in the ALI DB.

Figure 2:
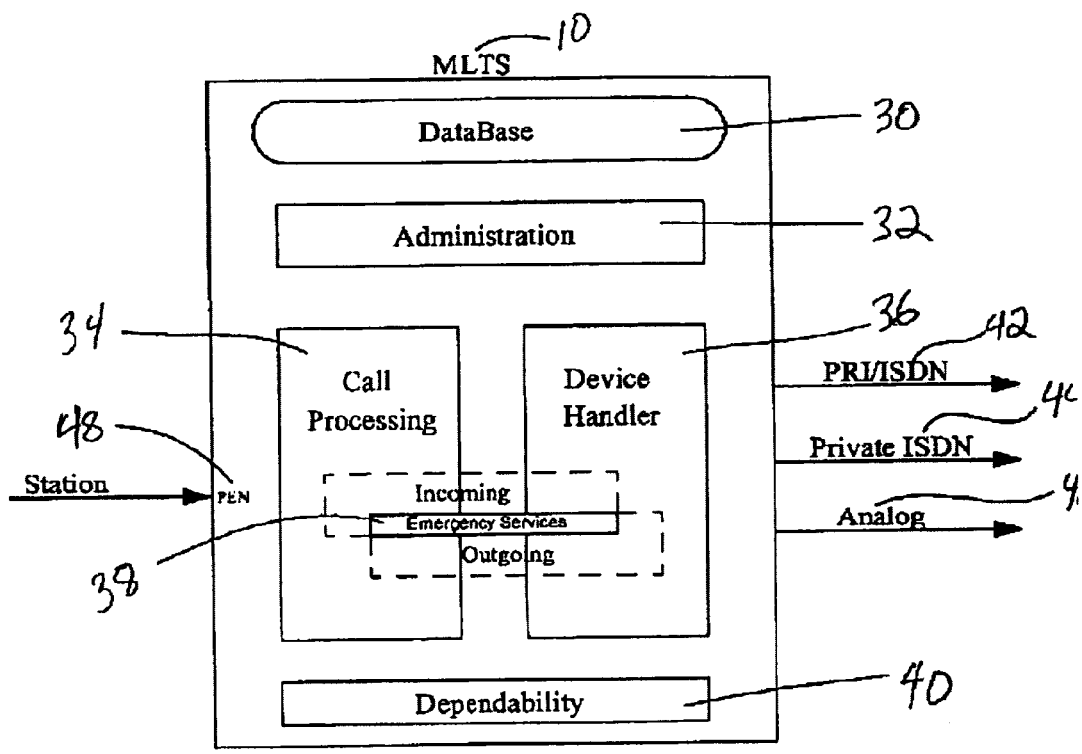
FIG. 2 is a high level block diagram of the apparatus of the invention.

Referring now to FIG. 2, an MLTS 10 according to the invention includes a database 30, a database administration module 32, a call processing module 34, a device handler 36, an emergency services (ES) module 38, and a dependability module 40. The dependability module 40 provides call recovery functions in the event of an equipment failure.

According to the presently preferred embodiment, the line side of the MLTS 10 includes a an ISDN Primary Rate Interface 42, a private ISDN interface 44 for coupling to other customer equipment, and an analog interface 46 for coupling to either the public network or the private network.

As mentioned hereinbefore, on the user side of the MLTS 10, each user equipment is coupled to a unique port and each port is assigned a unique port equipment number (PEN) 48. When an emergency call is dialed, call processing 34 recognizes the digits and invokes emergency services 38 which, using the PEN 48 retrieves the appropriate information from the database 30. The device handler 36 provides the necessary signaling/outpulsing depending on the type of trunk used.

Figure 3:
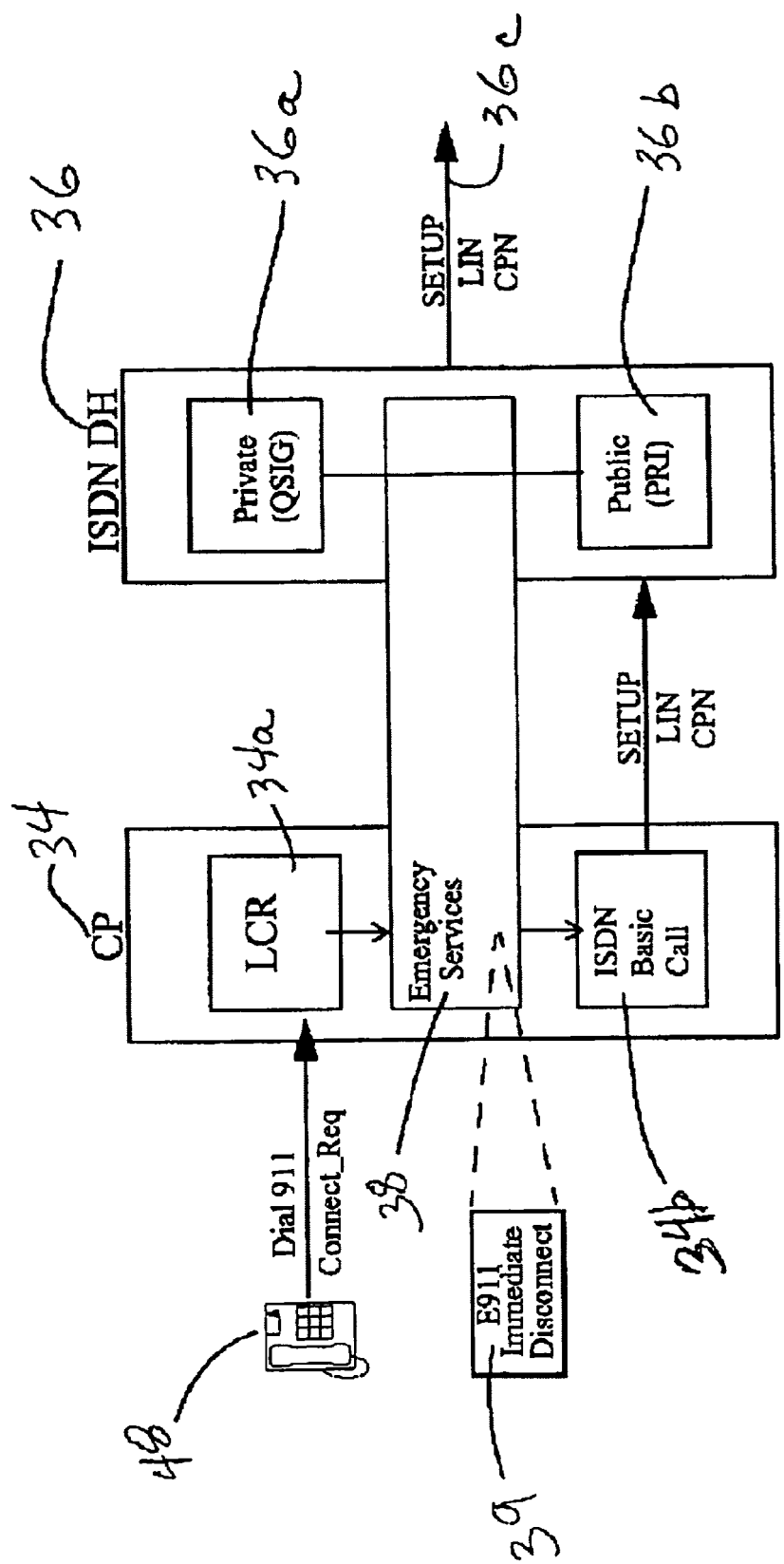
FIG. 3 is a high level block diagram of the call processor and device handler of FIG. 2 used in ISDN service.

Referring to FIG. 3, an ISDN call processing module 34 includes a least cost routing (LCR) module 34a and a basic call processing module 34b. The ISDN device handler 36 includes a private Q signaling module 36a and a public primary rate interface (PRI) 36b through which calls are setup and ELIN/callback number data is transmitted via link 36c. According to the invention, the emergency services module 38 includes an immediate disconnect module 39.

When the emergency caller 48 dials (e.g., 911), a connect request internal message is sent to the call processing module 34. The emergency digits are recognized by least cost routing (LCR) 34a and emergency services (ES) 38 is invoked for this call.

According to the invention the emergency digits are recognized on how the unit has been programmed. For example, an indicator on one or more digit patterns in the dial plan flags this as an emergency call when the digits match.

This mechanism "triggers"ES processing 38. ES 38 performs all the necessary functions to deliver this call as a priority emergency call with correct ELIN and Callback Number to the basic call processor 34c. Normal processing resumes for trunk selection, basic call establishment sending an internal message with the ELIN and Callback Number to Device Handler 36. DH 36 formats the call information appropriately for the trunk which has been awarded.

When the trunk is a private trunk, the ELIN and/or Callback Number (calling party number CPN) are formatted in a proprietary encoding and signaled with Q.sig 36a. When the trunk is a public trunk, the ELIN and Callback Number are formatted according to the primary rate interface 36b protocol. The ELIN and Callback Number are encoded in the SETUP message sent on the signaling channel.

Figure 4:
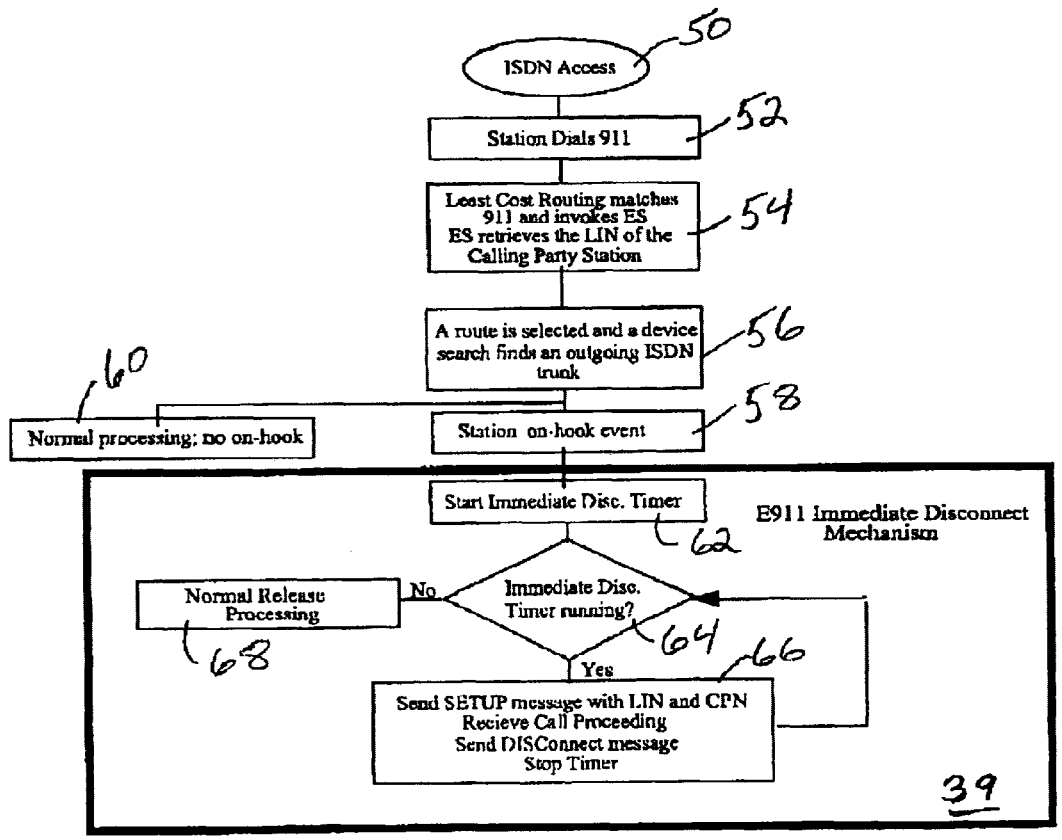
FIG. 4 is a high level flow chart illustrating operation of the invention with ISDN service.

FIG. 4 is a high level flow chart illustrating the logic of an emergency call routed via ISDN where the station goes on-hook and the call information is still sent.

The caller goes off-hook at 50 and dials an emergency number at 52. At 54 the digits are recognized and a least cost routing function invokes ES. ES retrieves the ELIN and optionally the callback number assigned to the ELIN and stores the information in a buffer. The device handler finds an outgoing trunk at 56 and places the call. If the caller goes on hook at 58, the immediate disconnect routine 39 is invoked. If the caller stays off hook, the call proceeds as normal at 60.

Upon invoking the immediate disconnect routine, a timer is started at 62. The timer is used primarily for an analog trunk and is optional with ISDN trunks. Instead of clearing the call buffers and dismissing the call, a check is made at 64 to see if the timer is running. If it is running, at 66, the call buffers will be retained, a SETUP message is sent with the ELIN and optional Callback number. Upon receiving a CALL PROCEEDING message (i.e., for enbloc-sending/receiving otherwise SETUP ACK for overlap sending/receiving), a DISConnect message shall be sent and the timer stopped. If the timer was not running, at 68, normal processing of clearing the call buffers and dismissing the call occurs.

Figure 5:
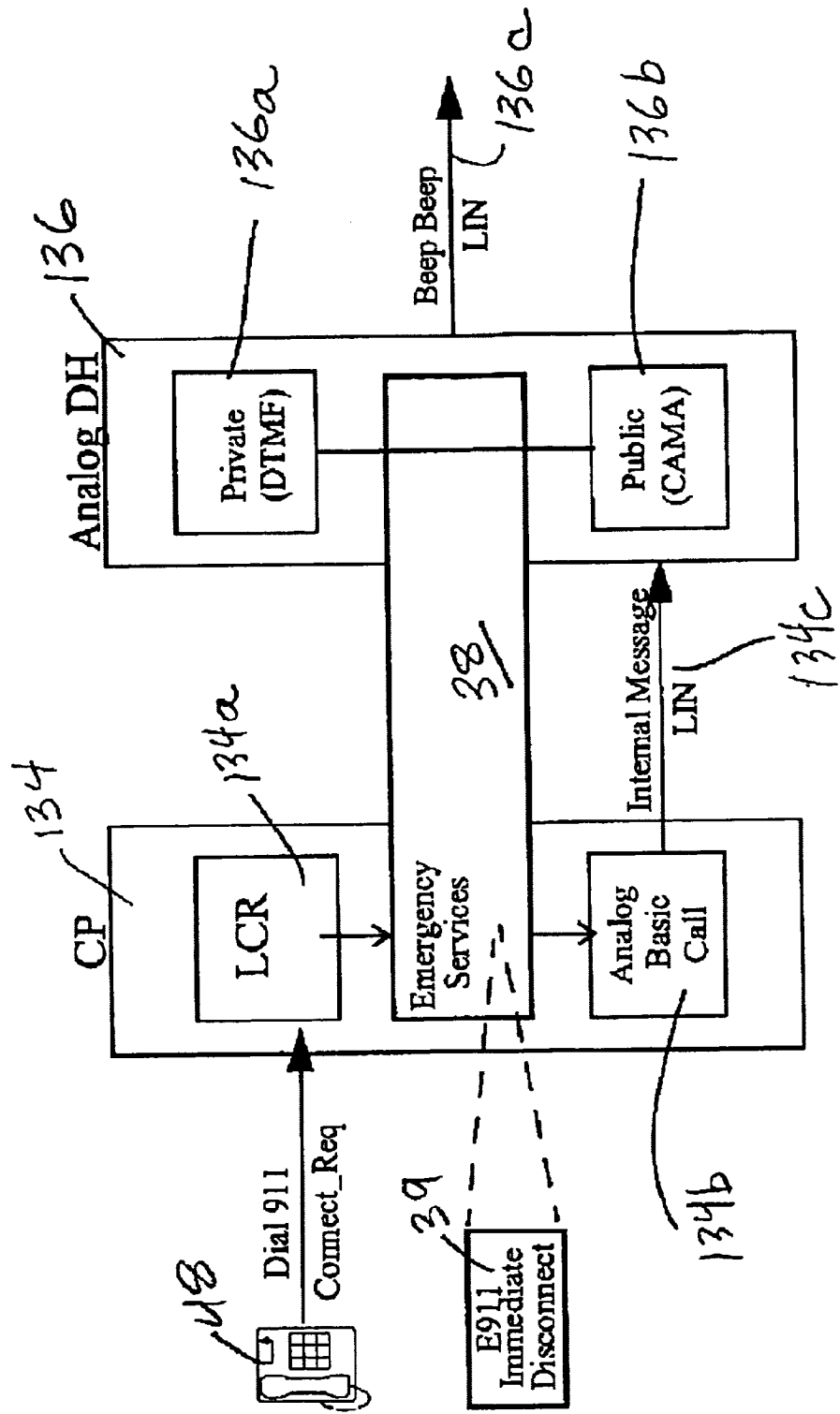
FIG. 5 is a high level block diagram of the call processor and device handler of FIG. 2 used in analog service.

Referring to FIG. 5, an analog call processing module 134 includes a least cost routing (LCR) module 134a and a basic call processing module 134b. The analog device handler 136 includes a private DTMF signaling module 136a and a public CAMA (centralized automatic message accounting) signaling module 136b through which calls are setup and ELIN/callback number data is transmitted via link 136c. According to the invention, the emergency services module 38 includes an immediate disconnect module 39.

When the emergency caller 48 dials (e.g., 911), a connect request internal message is sent to the call processing module 134. The emergency digits are recognized by least cost routing (LCR) 134a and emergency services (ES) 38 is invoked for this call. According to the invention the emergency digits are recognized depending on how the unit has been programmed. For example, an indicator on one or more digit patterns in the dial plan flags this as an emergency call when the digits match. This mechanism "triggers" ES processing 38. ES 38 performs all the necessary functions to deliver this call as a priority emergency call with correct ELIN and Callback Number to the basic call processor 134c. Normal processing resumes for trunk selection, basic call establishment sending an internal message with the ELIN and Callback Number to Device Handler 136. DH 136 formats the call information appropriately for the trunk which has been awarded. When the trunk is a private trunk, the ELIN and/or Callback Number (calling party number CPN) are formatted in a proprietary encoding and signaled with DTMF. When the trunk is a public trunk, the ELIN or Callback Number are formatted according to the CAMA module 136b. The ELIN or Callback Number are outpulsed after the destination digits (e.g., 911) during the SETUP enablement on the link 136c.

The analog process is similar to the ISDN process and the ES logic and immediate disconnect component are substantially the same as those used in the ISDN process. The internal messaging 134c to the analog DH 136 may be the same as with ISDN but, in the U.S., only a 10-digit NANP formatted ELIN or callback number may be sent, not both.

Figure 6:
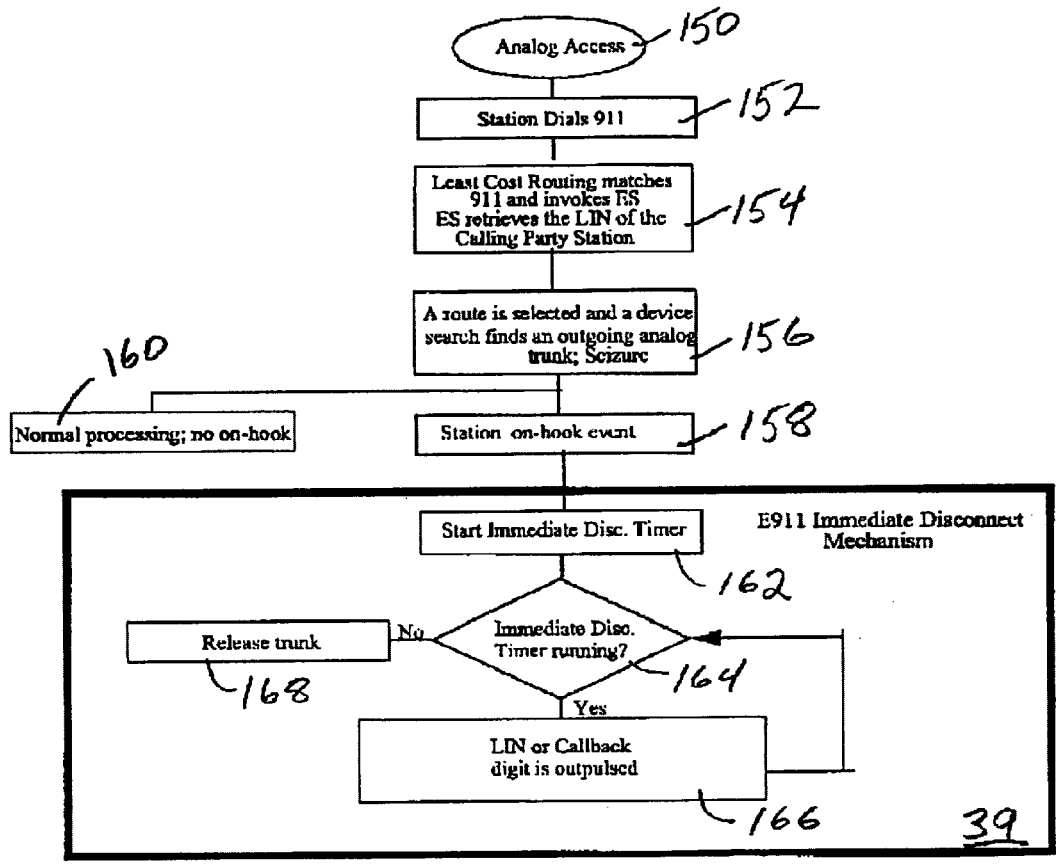
FIG. 6 is a high level flow chart illustrating operation of the invention with analog service.

FIG. 6 is a high level flow chart illustrating the logic of an emergency call routed via analog access where the station goes on-hook and the call information is still sent. The caller goes off-hook at 1150 and dials an emergency number at 152. At 154 the digits are recognized and a least cost routing function invokes ES. ES retrieves the ELIN and optionally the callback number assigned to the ELIN and stores the information in a buffer. The device handler finds an outgoing trunk at 156 and places the call. If the caller goes on hook at 158, the immediate disconnect routine 39 is invoked. If the caller stays off hook, the call proceeds as normal at 160.

Upon invoking the immediate disconnect routine, a timer is started at 162. Instead of clearing the call buffers and dismissing the call, a check is made at 164 to see if the timer is running. If it is running, at 166, the ELIN or callback number is outpulsed. If the timer was not running, at 168, normal processing of clearing the call buffers and releasing the trunk occurs.

There have been described and illustrated herein methods and apparatus for accurate transmission of a ELIN/callback number from an emergency caller calling from behind a PBX/MLTS after the caller has disconnected. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method for transmitting an emergency location identification number (ELIN) and/or callback number for an analog or digital telephonic device from which an emergency call was made, from customer premises equipment (CPE) to a public safety answering point (PSAP) after an emergency call goes on-hook, said method comprising the steps of:
    a) upon initiation of an emergency call, storing ELIN and/or callback number in a buffer at the CPE;
    b) upon detecting an on-book event at the telephonic device from which the emergency call was made, autonomously transmitting the ELIN and/or callback number from the buffer to the PSAP prior to disconnecting the call at the PBX/MLTS.

2. The method according to claim 1 further comprising the step of disconnecting the emergency call after said step of transmitting.

3. The method according to claim 2 further comprising the step of prior to said step of transmitting, initiating a timer, wherein said step of disconnecting is performed after the timer expires.

4. The method according to claim 1 wherein said step of transmitting to the public network (PRI) is accomplished via an ISDN SETUP message.

5. The method according to claim 1 wherein said step of transmitting is accomplished over a private network via QSIG ISDN SETUP message signaling.

6. The method according to claim 2 wherein said step of disconnecting is accomplished via an ISDN DISConnect message.

7. The method according to claim 1 wherein said step of transmitting over a private network and/or public network is accomplished via DTMF signaling.

8. The method according to claim 1 wherein said step of transmitting is accomplished via CAMA trunk type signaling.

9. The method according to claim 2 wherein said step of disconnecting is accomplished via a trunk release.

10. An apparatus for transmitting an emergency location identification number (ELIN) and/or callback number for an analog or digital telephonic device from which an emergency call was made, from customer premises equipment (CPE) to a public safety answering point (PSAP) after an emergency call goes on-hook, said apparatus comprising:
    a) storage means at the CPE for storing an ELIN and/or callback number upon initiation of an emergency call;
    b) transmitting means at the CPE coupled to said storage means for autonomously transmitting the stored ELIN and/or callback number to the PSAP upon detecting an on-hook event at the telephonic device from which the emergency call was made, prior to disconnecting the call at the PBX/MLTS.

11. The apparatus according to claim 10 further comprising disconnect means for disconnecting the emergency call after said transmitting means transmits the stored ELIN and/or callback number.

12. The apparatus according to claim 11 further comprising a timer coupled to said disconnect means, wherein said disconnect means disconnects the emergency call after said timer expires.

13. The apparatus according to claim 10 wherein said transmitting means includes means for sending an ISDN SETUP message.

14. The apparatus according to claim 10 wherein said transmitting means includes means for QSIG signaling.

15. The apparatus according to claim 11 wherein said disconnect means includes means for sending an ISDN DiSConnect message.

16. The apparatus according to claim 10 wherein said transmitting means includes means for DTMF signaling.

17. The apparatus according to claim 10 wherein said transmitting means includes means for CAMA trunk type signaling.

18. The apparatus according to claim 11 wherein said disconnect means includes means for sending a trunk release.

\* \* \* \* \*